United States Patent
Funaki

[19]

[11] Patent Number: 5,983,035
[45] Date of Patent: *Nov. 9, 1999

[54] METHOD OF DISPLAYING TITLE AND CAMERA AND CAMERA REMOTE CONTROLLER

[75] Inventor: Akihiko Funaki, Omiya, Japan

[73] Assignees: Fuji Photo Film Co., Ltd., Kanagawa; Fuji Photo Film Co., Ltd., Saitama, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/727,238

[22] Filed: Oct. 8, 1996

[30] Foreign Application Priority Data

Oct. 9, 1995 [JP] Japan ..................................... 7-261783
Jan. 31, 1996 [JP] Japan ..................................... 8-016141

[51] Int. Cl.$^6$ ............................. G03B 29/00; G03B 17/24
[52] U.S. Cl. ......................... 396/281; 396/310; 396/287; 396/292
[58] Field of Search ..................................... 396/310, 311, 396/313, 314, 315, 316, 317, 318, 319, 281, 287, 292

[56] References Cited

U.S. PATENT DOCUMENTS

| | | | |
|---|---|---|---|
| 4,965,627 | 10/1990 | Robinson | ................................... 355/40 |
| 5,023,637 | 6/1991 | Lorton et al. | ........................... 396/313 |
| 5,396,305 | 3/1995 | Egawa | ...................................... 396/310 |
| 5,617,161 | 4/1997 | Serita et al. | ............................. 396/319 |

*Primary Examiner*—Safet Metjahic
*Assistant Examiner*—Michael Dalakis
*Attorney, Agent, or Firm*—Sughrue, Mion, Zinn, Macpeak & Seas, PLLC

[57] ABSTRACT

A camera or a remote controller with memory stores pieces of title information which correspond to predefined titles. The title information includes a title number and title display data. The title number indicates a predefined title to be printed together with a frame image on photographic film. The title display data is displayed on a LCD in the same mode as a printing mode. The pieces of title information are sequentially fetched from the memory in response to a title selection operation. The title display data of a fetched piece of title information is displayed on the LCD so that a desired title can be selected.

31 Claims, 9 Drawing Sheets

FIG. 8(A)
TRANSMIT THE
NUMBER OF
PRINTS ONLY
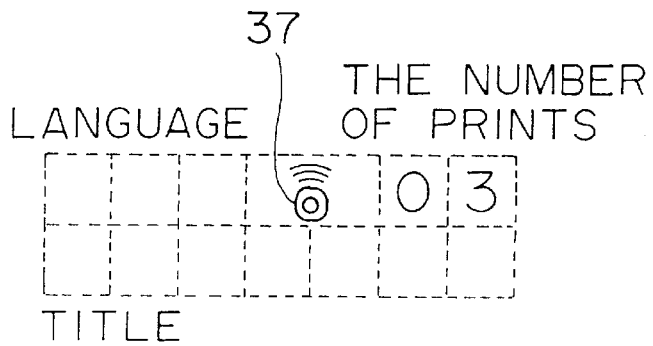
FIG. 8(B)
TRANSMIT
DESIGNATED
TITLE ONLY
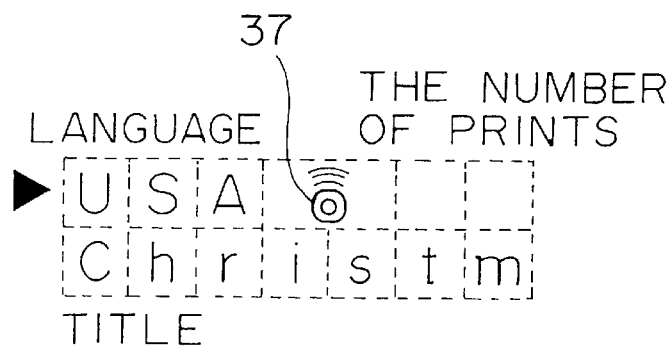
FIG. 8(C)
TRANSMIT
BOTH THE
NUMBER OF
PRINTS AND
DESIGNATED
TITLE

FIG. 10

| FRENCH | | GERMAN | | ITALIAN | |
|---|---|---|---|---|---|
| TITLE | TITLE NUMBER | TITLE | TITLE NUMBER | TITLE | TITLE NUMBER |
| Bonne Année | 1 | Dankeschön | 6 | Buon Compleanno | 4 |
| Félicitations | 2 | Frohes Neues Jahr | 1 | Congratulazioni | 2 |
| Je t'aime | 3 | Herzliche Glückwünsche | 2 | Felice Anno Nuovo | 1 |
| Joyeux anniversaire | 4 | Herzlichen Glockwünsch zum Geburtstag | 4 | Grazie | 6 |
| Mariage | 5 | | | Matrimonio | 5 |
| Merci | 6 | Hochzeit | 5 | Natale | 7 |
| Noël | 7 | Ich liebe Dich | 3 | Ti amo | 3 |
| | | Weihnachten | 7 | | |

| PORTUGUES | | SPANISH | | ENGLISH (AMERICAN ENGLISH) | |
|---|---|---|---|---|---|
| TITLE | TITLE NUMBER | TITLE | TITLE NUMBER | TITLE | TITLE NUMBER |
| Casamento | 5 | Boda | 5 | Christmas | 7 |
| Eu Te amo | 3 | Cumpleaños | 2 | Congratulations | 2 |
| Feliz Aniversário | 4 | Feliz Año Nuevoe | 1 | Happy Birthday | 4 |
| Feliz Ano Novo | 1 | Feliz cumpleaños | 4 | Happy New Year | 1 |
| Natal | 7 | Gracias | 6 | I Love You | 3 |
| Obrigado | 6 | Navidad | 7 | Thank you | 6 |
| Parabéns | 2 | Te quiero | 3 | Wedding | 5 |

| JAPANESE | |
|---|---|
| TITLE | TITLE NUMBER |
| アイラブユー | 3 |
| アケマシテ オメデトウ | 1 |
| アリガトウ | 6 |
| オタンジョウビ オメデトウ | 4 |
| オメデトウ | 2 |
| クリスマス | 7 |
| ケッコンシキ | 5 |

METHOD OF DISPLAYING TITLE AND CAMERA AND CAMERA REMOTE CONTROLLER

BACKGROUND OF THE INVENTION

1. Field of the Invention

The present invention relates to a method of displaying a title, and a camera, and a camera remote controller. More particularly, the present invention relates to a method of displaying a title when a title is selected during photographing, and a camera and a remote controller which are provided with a function of displaying the title.

2. Description of the Related Art

U.S. Pat. No. 4,965,627 discloses that a magnetic record layer is formed on a photographic film; a film manufacturer records information indicating the film type, development formula, etc. onto the magnetic record layer on the film; during photographing, pieces of information are recorded onto the magnetic record layer by a magnetic record device build into the camera; information indicating whether copies need to be printed or not is recorded onto the magnetic record layer at a photo processing shop; or ID information indicating where the developed photographic film is supplied is recorded onto the magnetic record layer at a photofinishing laboratory. The above-mentioned information is read appropriately in the process of handling the photographic film, and the information read can be used for the purpose of control and collation at each step, so that the process can be automatic and efficient.

The photographing information, which is recorded on the magnetic record layer on the photographic film during photographing, relates to a title, which is printed together with a photo image when a print photograph is printed, the number of prints, etc. It can be seen that various methods have been developed for the purpose of magnetically recording the data indicating the title. In one method, a title number of a desired title is selected among prepared titles (e.g. 30 titles); the title number is recorded as magnetic information onto a photographic film; at a photofinishing laboratory, the title, which is magnetically recorded on the photographic film, is read, and a title corresponding to the title number is printed with a photo image on a photographic printing paper.

It must be easy to set the title number in the camera because the subject and composition have already been determined, and only waiting for the processing of the shutter button is needed. Even in the above-described method of setting the title number in the camera, the title number can be set easily if a user memorizes the title number corresponding to a desired title. However, the user cannot memorize many titles and their title numbers, and thus the user must find a desired title by referring to a title table in which the titles are recorded, so as to set the title numbers of the titles in the camera. Moreover, the user must always carry the title table with him.

SUMMARY OF THE INVENTION

The present invention has been developed in view of the above-described circumstances, and has as its object the provision of a method of displaying a title, and a camera, and a camera remote controller which make it possible for the user to find a desired title easily without carrying the title table with him and finding the desired title and its title numbers from the title table.

To achieve the above-mentioned object, the present invention is directed to a method of displaying a title when recording a title number onto a magnetic record layer on a photographic film, title number which indicates a title, which is selected appropriately according to a subject during photographing; comprising the steps of: storing, in memory, pieces of title information as many as titles which have been prepared beforehand, the title information being composed of a title number indicating a title, which is printed together with a frame image on a photographic film, and title display data for displaying the title on display means in the same mode as a printing mode; fetching the pieces of title information sequentially from the memory in accordance with a title selecting operation; and displaying the titles sequentially on the display means according to the title display data in fetched title information, whereby making it possible to select a desired title.

That is, the title, which is printed with a frame image on the photographic film, is displayed on the display means in the same mode as a printing mode, thereby making it possible to select a desired title while viewing the title displayed on the display means. When the title is selected, the titles are displayed sequentially on the display means alphabetically or in the order of the Japanese syllabary, so that a desired title can be easily found. Moreover, if a language has been changed to another language, a title which has the same meaning as the previous title displayed on the display means but is written in a different language is displayed. Thereby, the titles of the same meaning in different languages can be found easily.

Furthermore, if the number of characters in a title, which is selected by the title selecting operation, exceeds the number of characters which can be displayed simultaneously on the display means, the title is scrolled to be displayed, so that the required information (a title designated for printing) can be confirmed easily and simply even if the number of displayed characters is small.

In addition, it is possible to designate the number of prints as well as the title by means of the display means of the camera remote controller. The title number indicating the title displayed on the display means and the number of prints can be simultaneously transmitted to the camera.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 8(A), 8(B) and 8(C) are views showing examples of the display when a transmission key is pressed;

FIG. 10 is a table showing the titles and their title numbers in French, German, Italian, Portuguese, Spanish, English (American English) and Japanese.

DESCRIPTION OF THE PREFERRED EMBODIMENTS

Figure 1:
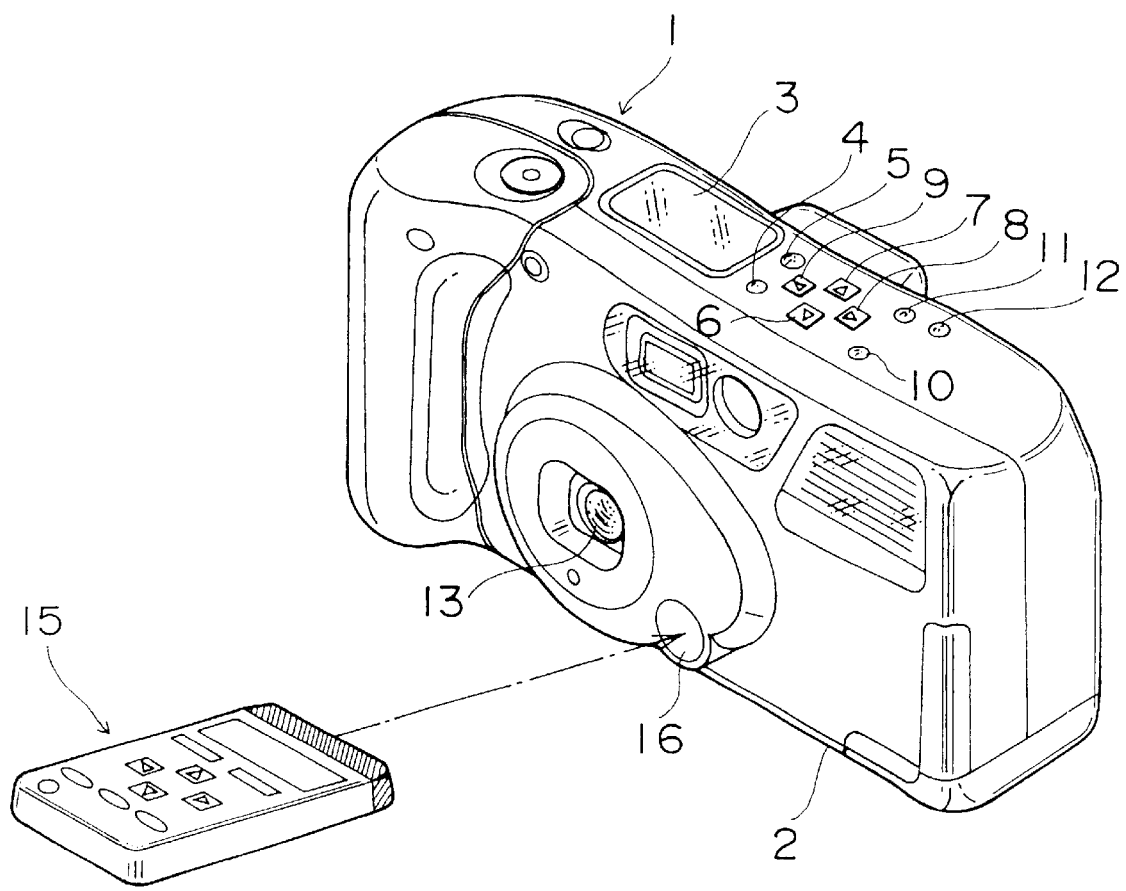
FIG. 1 is a schematic view showing the appearance of a camera and a camera remote controller according to the present invention.

FIG. 1 illustrates the appearance of a camera 1 which uses a method of displaying titles according to the present invention. In FIG. 1, there are provided at the top of a camera body 2 a liquid crystal display (LCD) 3 for displaying the number of prints, titles (captions), etc.; a key (PQ (Print Quantity) key) 4 for designating the number of prints; a key (ST (Selecting Title) key) 5 for designating a language and a title; up and down keys 6 and 7 which are operated when the number of prints is varied and the title is retrieved; forward and backward scroll keys 8 and 9 which are operated when the titles are scrolled to the left and right to be displayed; a set key 10 for setting the titles, etc. displayed on the LCD 3 so that they can be recorded magnetically; and a clear key 12 for clearing what is displayed on the LCD 3.

The LCD 3 is of the dot matrix system so that the languages are changed to display the title, etc. An infrared acceptor 16 is provided for accepting a transmission signal of infrared light transmitted from a camera remote controller 15.

Figure 2:
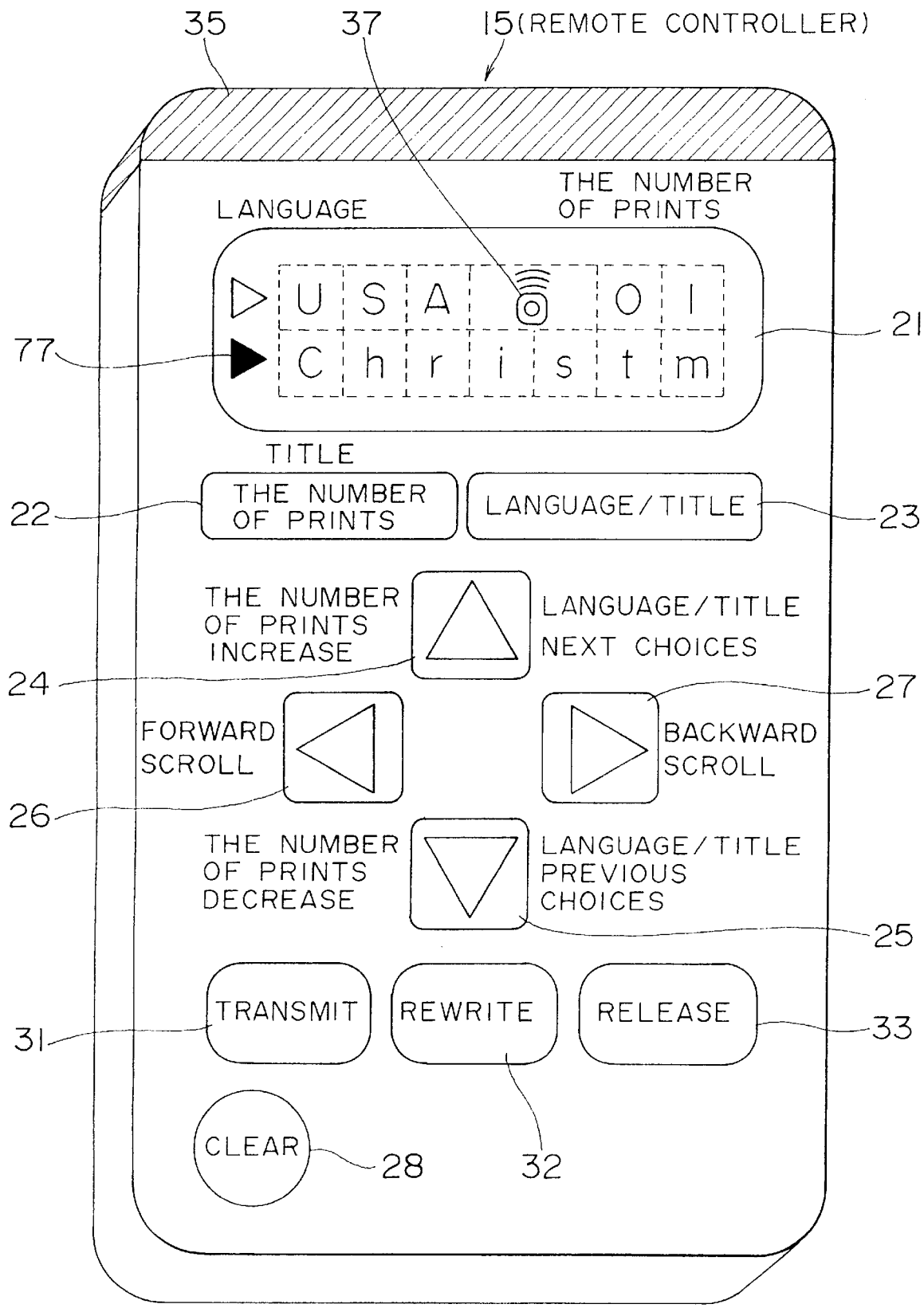
FIG. 2 is a view showing a liquid crystal display and each key in the camera remote controller according to the present invention.

The camera remote controller 15 does not operate the camera directly. It designates the number of prints and the title for the camera, and performs the release operation. As shown in FIG. 2, the camera remote controller 15 is provided with a LCD 21 of the dot matrix system, which is similar to the one at the top of the camera body 2, a PQ key 22, a ST key 23, an up key 24, a down key 25, a forward scroll key 26, a backward scroll key 27, a clear key 28, a transmission key 31, a rewrite key 32 and a release key 33. The front portion 35 of the camera remote controller 15 is an infrared pass filter. A light-emitting diode (LED) is provided inside the infrared pass filter, and the LED is lighted when various kinds of signals are transmitted to the camera.

The LCD 21 is vertically divided in two, and it displays the designated language using three characters of the alphabet (an abbreviated designation for the name of a country) at the left in the upper section, the number of prints using a two digit number at the right in the upper section, and seven characters of a title from its head in the language in the lower section. A transmission mark 37 is provided between the language and the number of prints, and the transmission mark 37 is blinked and displayed when some signal is transmitted to the camera 1.

Figure 3:
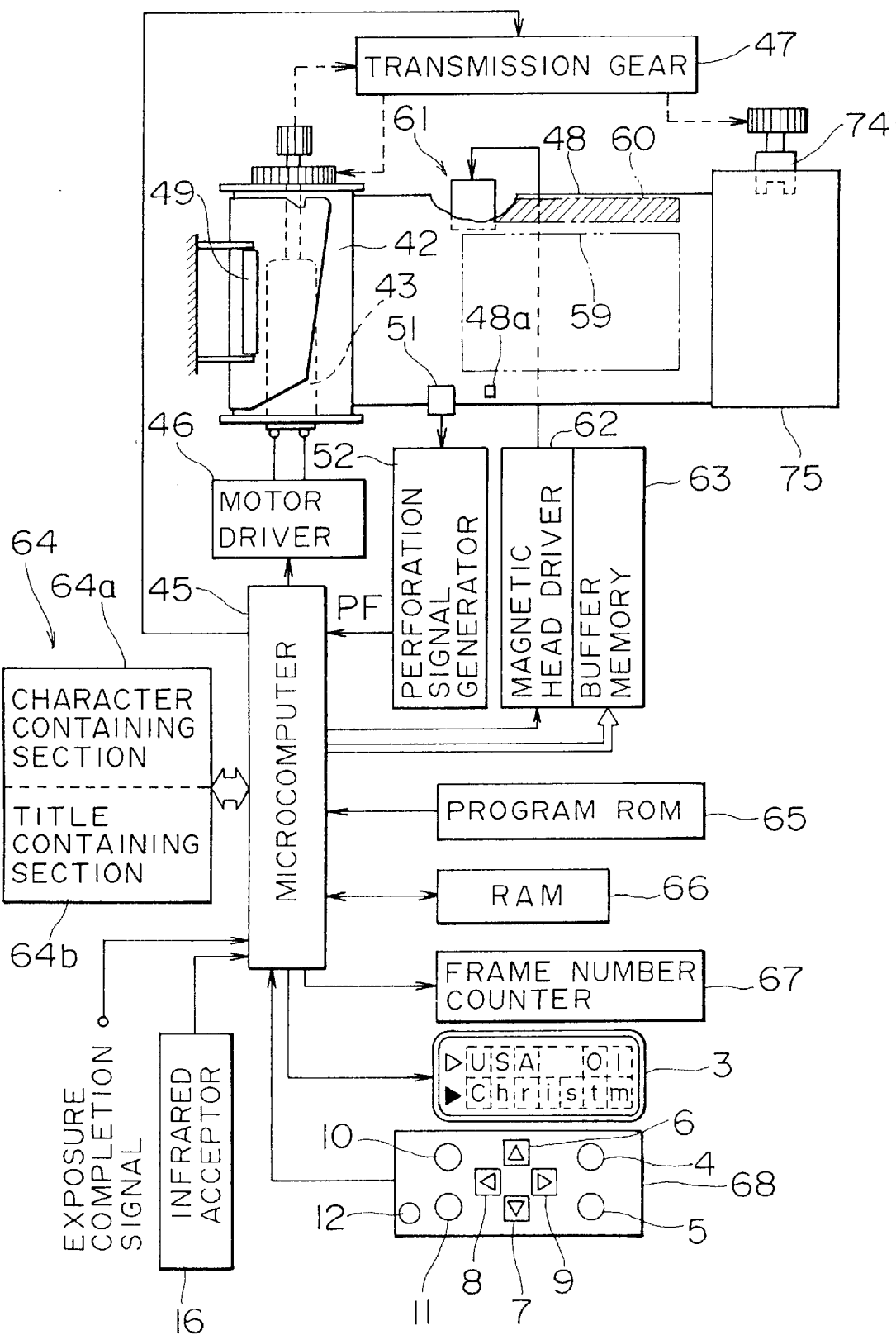
FIG. 3 is a schematic view showing the essential parts composing the camera according to the present invention.

FIG. 3 shows the basic structure of the camera 1. As shown in FIG. 3, a motor 43 for winding the film is built in a windup spool 42, and the motor 43 is driven by a motor driver 46 conforming to the command from a microcomputer 45. During photographing, a transmission gear 47 is switched for winding conforming to the command from the microcomputer 45, and when an exposure completion signal is input into the microcomputer 45 after photographing, the motor 43 is driven. Driving force of the motor 43 is transmitted to the windup spool 42 via the transmission gear 47, and a photographic film 48 is wound up by the windup spool 42. In a vicinity of the windup spool 42, there is provided a pressing roller 49, which presses the end of the photographic film 48 against the windup spool 42 in the early stages of winding up the photographic film 48.

In order to feed the frame on the photographic film 48, a reflex photo sensor 51 is used which detects the passage of a perforation 48a on the photographic film 48. When the winding of the film is started, the photo sensor 51 watches the reflected light while radiating the infrared light toward the photographic film 48. When the photo sensor 51 detects the perforation 48a, a PF pulse is input into the microcomputer 45 from a perforation signal generator 52.

Upon receiving the PF pulse, the microcomputer 45 sends a stop signal to the motor driver 46, and stops the motor 43 momentarily. In the embodiment shown in the drawing, one perforation 48a is provided for one frame on the photographic film 48, and thereby the film winding is stopped when the photo sensor 51 detects the perforation 48a.

A magnetic head 61 is provided at the outside of the frame of an exposure aperture 59 of the camera 1, and a magnetic head driver 62, which drives the magnetic head 61, connects the magnetic head 61 and the microcomputer 45. The magnetic head driver 62 drives the magnetic head 61 upon receiving a command signal from the microcomputer 45 while one frame is wound after photographing, and the magnetic head 61 magnetically records the data such as the number of prints, which data is written in a buffer memory 63, onto a magnetic record layer on the photographic film 48. Reference numeral 60 indicates an area where the data is magnetically recorded.

The microcomputer 45 connects to a data read-only memory (ROM) 64, which consists of a character containing section 64a and a title containing section 64b. The character containing section 64a contains various kinds of character data for each address, which data is used for displaying the number of prints and the titles on the LCD 3.

FIG. 10 is a table showing the titles and their title numbers in French, German, Italian, Portuguese, Spanish, English (American English) and Japanese.

As shown in FIG. 10, the title containing section 64b contains the titles, which are set during photographing, in each language together with respective title numbers. The titles are contained alphabetically in each language (in the order of the Japanese syllabary in the case of Japanese). The titles contained in the title containing section 64b are the title display data composed of the address data of each character. The title is designated with the language number and the title number. An rewritable electrically erasable programmable ROM (EEPROM) for example is used for the data ROM, and the data ROM can be updated according to the change in specifications.

A program ROM 65 contains programs for executing the photographing sequence and the data recording sequence. An random-access memory (RAM) 66 is used as a working area for temporarily containing the data and flag, which are required for execution of the photographing sequence and the data recording sequence. A frame number counter 67 counts the number of frames on the photographic film 48, which frames have already been photographed. The PQ key 4, the ST key 5, the up and down keys 6 and 7, the forward and backward scroll keys 8 and 9, the set key 10, the rewrite key 11 and the clear key 12 are attached to a board 68, which connects to the microcomputer 45. The LCD 3 and the infrared acceptor 16 connect to the microcomputer 45.

Figure 4:
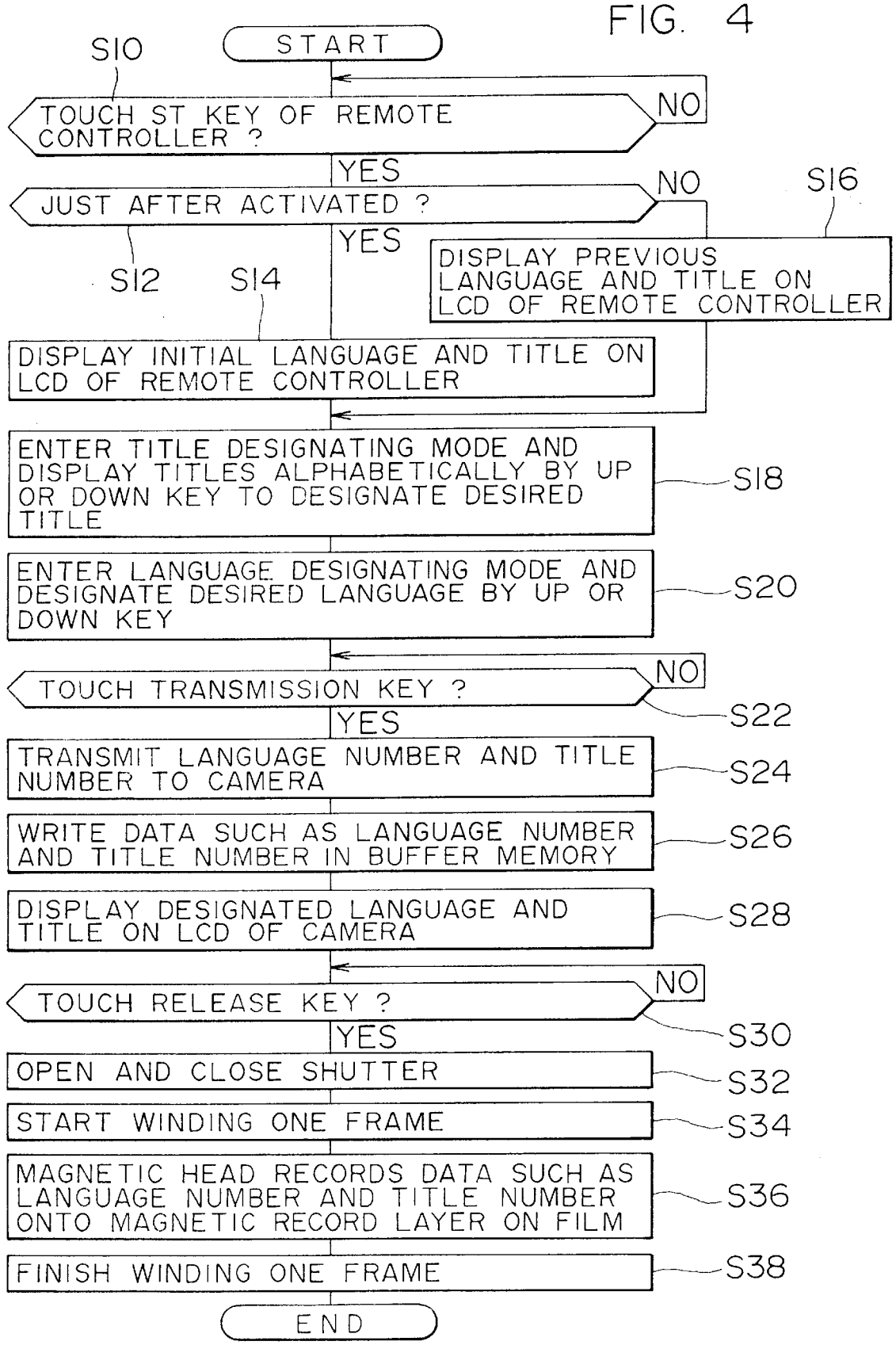
FIG. 4 is a flow chart showing indication, setting, transmission, etc. of titles.

With reference to the flow chart in FIG. 4, an explanation will hereunder be given about the method of designating the number of prints and the titles in the camera 1, which is constructed in the above-mentioned manner, by means of the camera remote controller 15. If unused for a long time, the camera remote controller 15 automatically enters the power saving mode, and the LCD 21 is in the non-display state. In this state, if the PQ key 22, the ST key 23 or the release key 33 is touched, the camera remote controller 15 is turned on, and the following initial values are displayed on the LCD 21 (Steps S10, 12, 14 and 16).

The number of prints=01

Language=USA

Title=Christmas

In Step S10, the ST key 23 is touched to be turned on. The camera remote controller 15 is provided with the same one as the data ROM 64 built in the camera 1. The character containing section and the title containing section are referred to according to the operation of the keys, and the number of prints and the title are displayed on the LCD 21.

Figure 5:
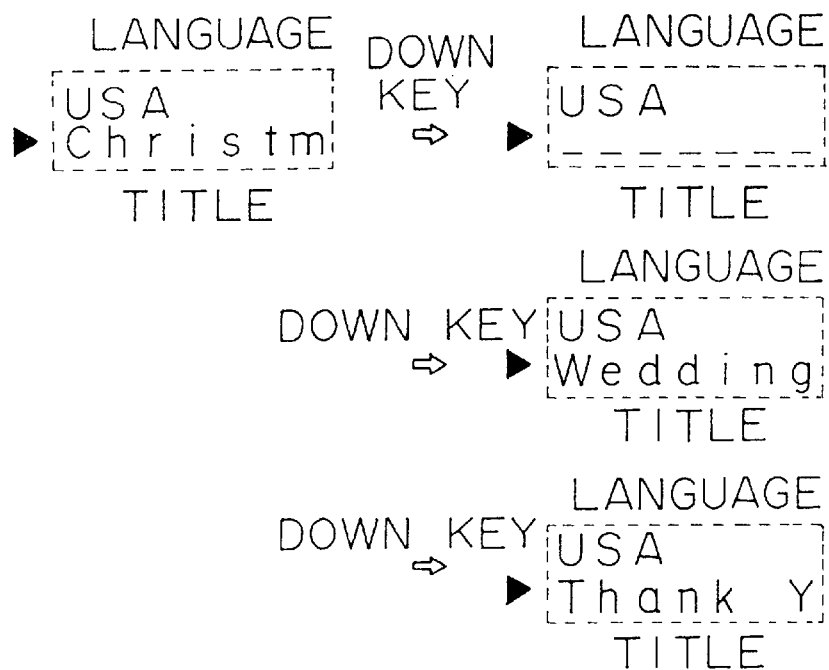
FIG. 5 is a view showing that titles are shown alphabetically.
Figure 6:
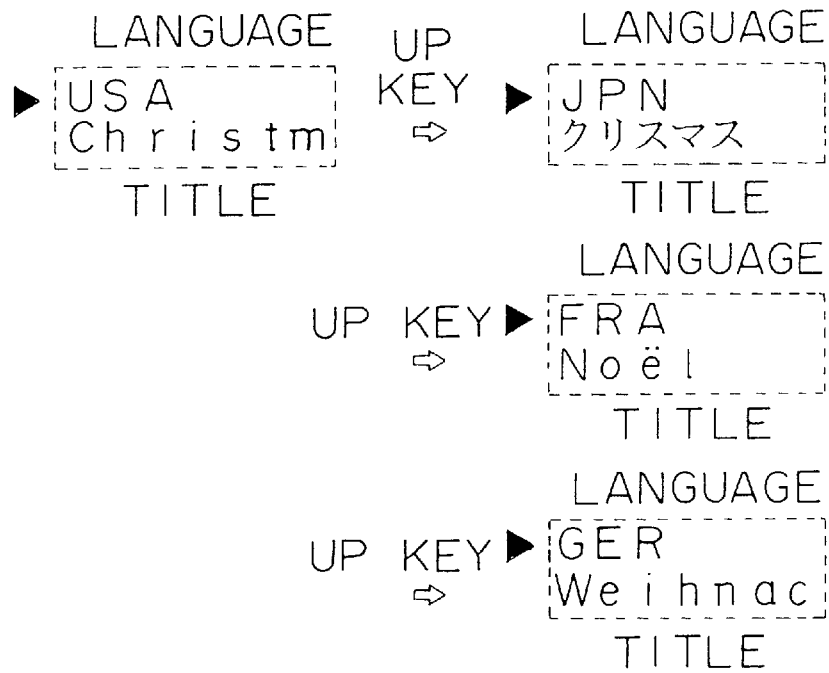
FIG. 6 is a view showing that the titles are changed according to the language.

Next, the camera remote controller 15 enters the title designating mode, and the title is designated with the up key 24 and the down key 25 (Step S18). In this case, the title is called in the order of their addresses in the title containing section, and the titles are displayed alphabetically on the LCD 21 (in the order of the Japanese syllabary in the case of Japanese), so that the title can be retrieved easily. As shown in FIG. 5, for example, when the down key 25 is touched, the titles are displayed in the order contrary to the alphabetical order.

If the title is designated with the up key 24, only dashes are displayed next to the last title (in the alphabetical order or in the order of the Japanese syllabary), indicating that no title is displayed. Then, the first title (in the alphabetical order or in the order of the Japanese syllabary) such as Christmas is displayed again. The results are the other way around if the title is designated with the down key 25.

Next, after the camera remote controller 15 enters the language designating mode upon the touching of the ST key 23, a language is designated with the up key 24 or the down key 25 (Step S20). When the languages are changed, the displayed title changes to a title of the same meaning in the newly designated language as shown in FIG. 5. That is, the camera remote controller 15 has a simple translation function. If the title of the same meaning is not prepared, only dashes are displayed.

Figure 7:
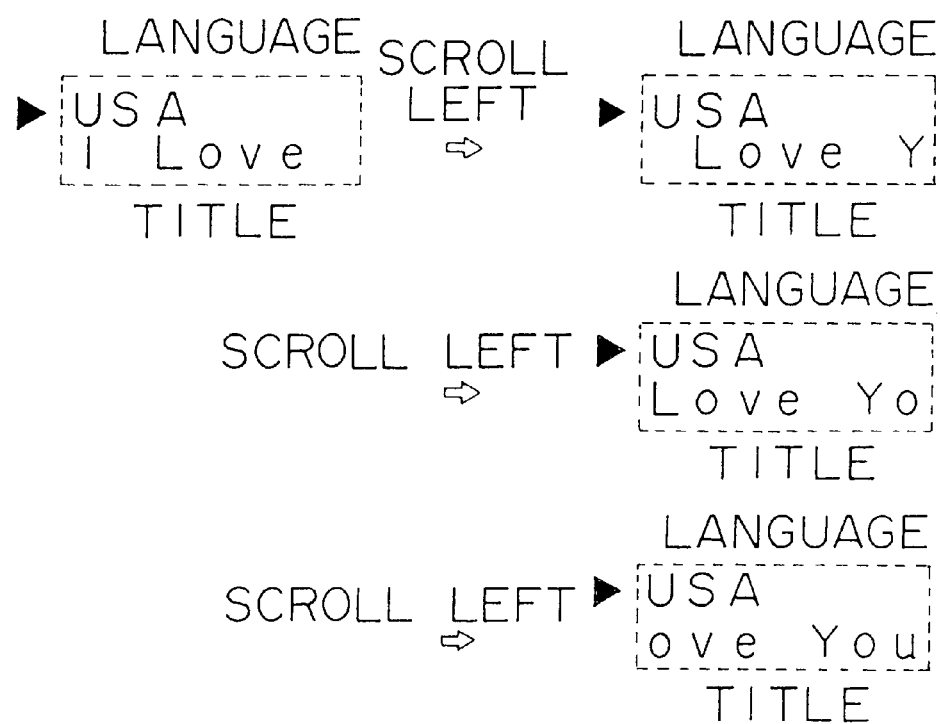
FIG. 7 is a view showing the titles that are scrolled to be displayed.

As shown in FIG. 7, if the number of characters in the title selected in Step S18 or S20 exceeds the number of characters (seven) which can be displayed simultaneously on the LCD 21, and if an effective key is not touched for more than one second from the display of the first seven characters of the title, the characters automatically feed to the left (4 Hz), and the title is scrolled to be displayed. When one second has passed after the last seven characters of the title are displayed, the first seven characters are displayed again.

On the other hand, if the effective key is touched while the title feeds automatically to be displayed, the processing of the key is performed in such a state that the title is displayed with the first seven characters. If the forward and backward scroll keys 26 and 27 are touched while the title feeds automatically to be displayed, the title stops in the present display state. If the forward and backward scroll keys 26 and 27 are touched while the title does not feed automatically to be displayed, the title is scrolled character by character.

Next, an explanation will be given about the method of controlling the remote controller transmission by the camera remote controller 15.

If the transmission key 31 is touched after the number of prints or the title is designated via the print number designating mode or the title designating mode/language designating mode, the LED in the front portion 35 emits light according to a signal (hereinafter referred to as a PQ signal) indicating the designated number of prints and/or a signal (hereinafter referred to as a ST signal) indicating title number/language number of the title, and the PQ signal and/or the ST signal are transmitted to the camera 1 conforming to a predetermined format of the transmission signal.

The transmission signals are combined as follows:

(a) PQ signal or ST signal or PQ signal+ST signal (b) PQ signal or ST signal or PQ signal+ST signal+ Rewrite signal (c) Release signal The signals in (b) are transmitted when the rewrite key 32 is touched, and the release signal in (c) is transmitted when the release key 33 is touched.

As shown in FIGS. 8(A), 8(B) and 8(C), the designated number of prints and title are displayed on the LCD 21 (the undesignated ones are not displayed), and the transmission mark 37 is blinked (one second at 4 Hz) to show that the transmission is under way.

The flow chart of FIG. 4 shows that the transmission key 31 is touched to transmit only the designated title (Steps S22 and S24). The signal transmitted to the camera 1 is input into the microcomputer 45 via the infrared acceptor 16. The microcomputer 45 writes the data relating to the language number and the title number into the buffer memory 63 according to the signal. At the same time, the microcomputer 45 displays the corresponding language and title on the LCD 3 with reference to the character containing section 64a and the title containing section 64b (Steps S26 and S28).

When the title is displayed, the microcomputer 45 retrieves the title data contained in the title containing section 64b in accordance with the input language number and title number. Then, the microcomputer 45 retrieves the applicable character data contained in the character containing section 64a, and displays the title on the LCD 3. The number of prints, the title, etc. can also be designated with the keys provided at the top of the camera body 2.

When the release key is touched (Step S30), the predetermined exposure control such as the opening and closing of the shutter is performed (Step S32), and then the winding of one frame on the photographic film 48 starts automatically (Step S34). During the winding of one frame on the photographic film 48, the microcomputer 45 sends a command signal to the magnetic head driver 62. The magnetic head driver 62 drives the magnetic head 61 to magnetically record the data such as the number of prints, the language number and the title number, which data is written in the buffer memory 63, onto the magnetic record layer on the photographic film 48 (Step S36). When the winding of one frame is completed, the sequence of the recording of the magnetic information is finished (Step S38).

After the data such as the number of prints, the language number and the title number, is recorded onto the magnetic record layer of each frame subject to photographing, and the photographing is completed, the photographic film 48 is rewound into a patrone 75, and it is presented to a photo processing shop together with the patrone 75. After being developed, the photographic film 48 is set in an automatic printer provided with the memory which contains the character data and title data similar to those in the data ROM 64 of the camera 1. The automatic printer performs the printing by reading the data recorded on the magnetic record layer of each frame subject to photographing. When reading the title number in the magnetic record layer, the automatic printer retrieves the applicable title from the memory in accordance with the combinations of the title number and the language number, and displays the retrieved title on, for example, a cathode-ray tube (CRT) of high luminance for printing. The automatic printer exposes the photo image of the frame subject to photographing on photographic print paper, thereby exposing the title on the same photographic print paper.

In the above-described embodiment, the titles are contained in the title containing section of the data ROM in the alphabetical order or in the order of the Japanese syllabary, and the titles are fetched in the order of their addresses in the title containing section. The titles may be contained in the title containing section in the order of title numbers, and they may be fetched in the alphabetical order or in the order of the Japanese syllabary. Moreover, in this embodiment, as shown in FIG. 10, the number of languages and titles are seven, respectively; however, the present invention is not restricted to this. Further, the LCD for displaying the titles, etc. and the keys for retrieving and designating the titles, etc. may not be provided in the camera, and the titles, etc. may be retrieved and designated with the camera remote controller only.

Figure 9:
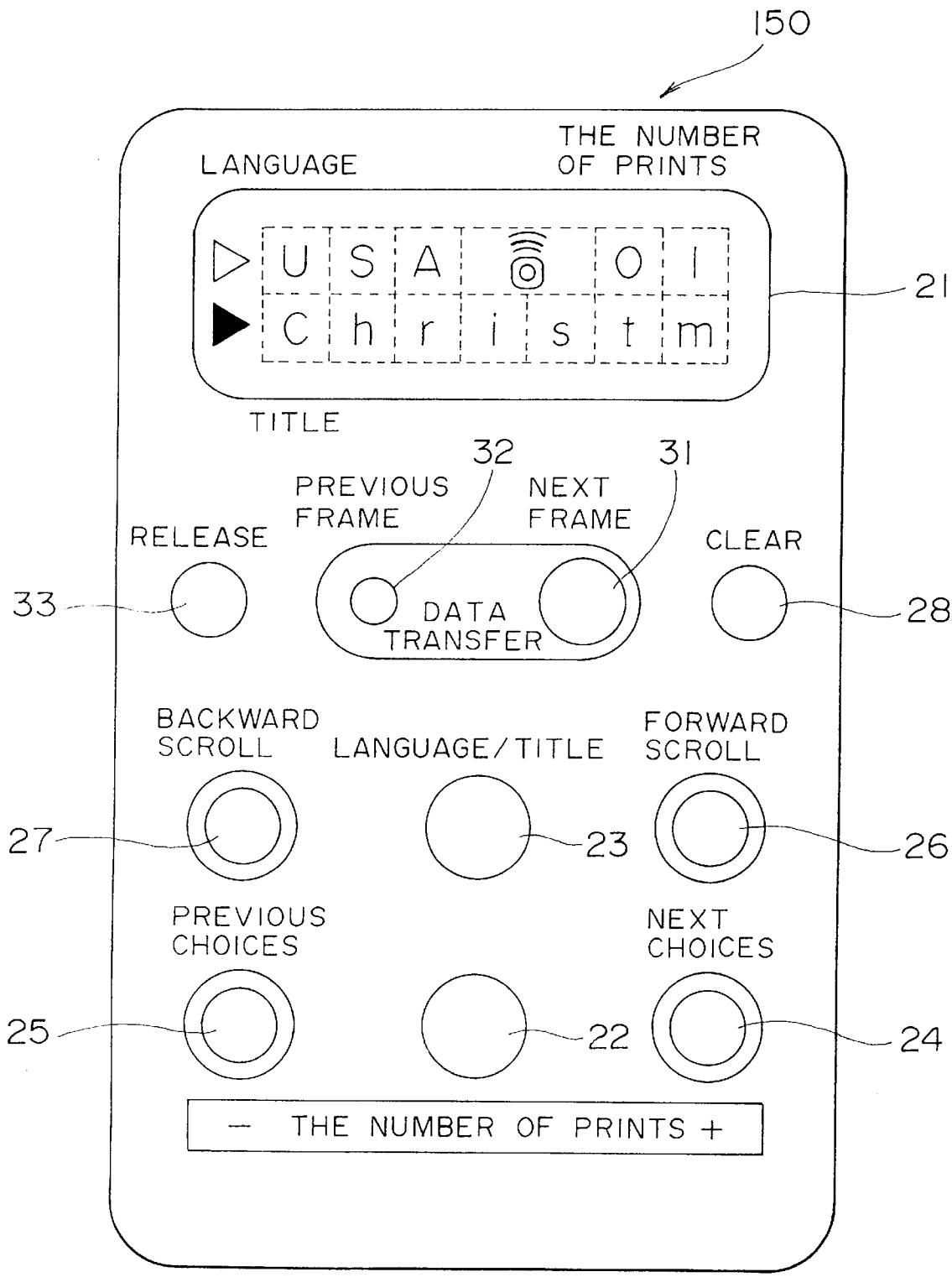
FIG. 9 is a view illustrating the appearance of another embodiment of the camera remote controller according to the present invention.

FIG. 9 shows the appearance of another embodiment of the camera remote controller according to the present invention. The camera remote controller 150 is different from the camera remote controller 15 in FIG. 2 only in its arrangement of keys; however, the camera remote controllers 15 and 150 have the same functions. For this reason, parts similar to those in the camera remote controller 15 previously described with reference to FIG. 2 are denoted by the same reference numerals, and they will not be explained.

As set forth hereinabove, according to the method of displaying title, and the camera and the camera remote controller of the present invention, the title, which is printed together with the frame image on the photographic film, is displayed on the display means in the same mode as the printing mode, and the user can select the desired title while viewing the title displayed on the display means. Thereby, the user can easily select the desired title without carrying the title table and finding the desired title and its title number from the title table. Moreover, the titles are displayed sequentially on the display means so that the title can be selected. The titles are displayed alphabetically or in the order of the Japanese syllabary, and thereby the desired title can be found easily. Further, if a language is changed to another language by the language selecting operation, a title which has the same meaning as the title displayed on the display means but is written in a different language, is displayed, and thus the titles of the same meaning in different languages can be found easily.

Furthermore, if the number of characters in the title which is selected according to the title selecting operation, exceeds the number of characters which can be displayed simultaneously on the display means, the title is scrolled to be displayed. Thereby, even if the number of displayed characters is small, the required information (the title to be printed) can be confirmed easily.

In addition, the title data may be contained in the memory in alphabetical order of the titles or in the order of the Japanese syllabary of the titles, and the data may be fetched in the order of their addresses in the memory. When the title is displayed in plural languages, it is favorable that the LCD of the dot-matrix system is used for the display means.

If the title is designated by means of the camera remote controller provided with the display means and the memory which are similar to those of the camera, the title can be designated easily, for example, even after the camera is positioned. The camera is restricted in its size and shape of the key and the display means in view of the design; whereas, the camera remote controller is hardly restricted. Hence, in the camera remote controller, the key can be formed in such a shape as to be easily operated, and the display means can be formed in such a size as to be easily seen, so that the title can be retrieved and designated efficiently.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. In a camera having a display, a method of designating a title to be printed together with a frame image from a frame of photographic film, comprising the steps of:

providing said camera with a memory having title information including title numbers, corresponding predetermined titles, and title display data for displaying said title on said display in the same mode as a printing mode, wherein said predetermined titles include titles having different respective meanings;

performing a title selecting operation including sequentially fetching said predetermined titles from said memory; and displaying a currently selected one of said predetermined titles on said display according to said title display data;

said providing step being performed so that each of said predetermined titles is provided in a plurality of different languages;

selecting one of said plurality of different languages;

said fetching of said predetermined titles from memory including retrieving said title information from said memory, said title information indicating the title in said selected language, said title having the same meaning as the title which has been selected in accordance with said title selecting operation; and displaying said title in said selected language on said display.

2. The method of designating a title to be printed as defined in claim 1; wherein:

said title information is stored in said memory in title number order; and said sequential fetching has a sequence based on the alphabetical order of said predetermined titles or on the order of the Japanese syllabary of said predetermined titles.

3. The method of designating a title to be printed as defined in claim 1, wherein:

said title information is stored in said memory in title alphabetical order or in the order of the Japanese syllabary; and said sequential fetching has a sequence based on the memory address order.

4. The method of designating a title to be printed as defined in claim 1, further comprising the step of displaying, on said display, one of:

the name of said language, the name of a country using said selected language, an abbreviation for said selected language, and an abbreviation for said country using said selected language.

5. The method of designating a title to be printed as defined in claim 1, wherein, when the number of characters in said currently selected one of said predetermined titles exceeds the number of characters which can be simultaneously displayed on said display, said title is scrolled to be displayed.

6. The method of designating a title to be printed as defined in claim 5, wherein said scrolling is performed so that said currently selected one of said predetermined titles is shifted automatically character by character, and, when the last character is displayed, said display returns to an initial display state.

7. The method of designating a title to be printed as defined in claim 5, wherein said scrolling of said currently selected one of said predetermined titles is manually performed on said display character by character.

8. In a camera having a display, a method of designating a title to be printed together with a frame image from a frame of photographic film, comprising the steps of:

providing said camera with a memory having title information which includes title numbers, corresponding predetermined titles, and corresponding title display data for displaying said title on said display in the same mode as a printing mode, each of said predetermined titles being provided in a plurality of different languages;

selecting one of said plurality of different languages;

performing a title selecting operation including sequentially fetching said predetermined titles from said memory in said selected language;

displaying a currently selected one of said predetermined titles on said display in said selected language according to said corresponding title display data; and displaying, on said display, a title which is written in a different language from the title which has been displayed on said display but has the same meaning.

9. In a camera having a display, a method of designating a title to be printed together with a frame image from a frame of photographic film, comprising the steps of:

providing said camera with a memory having title information which includes title numbers, corresponding predetermined titles, and corresponding title display data for displaying said title on said display in the same mode as a printing mode, each of said predetermined titles being provided in a plurality of different languages;

selecting one of said plurality of different languages;

performing a title selecting operation including sequentially fetching said predetermined titles from said memory in said selected language; and displaying a currently selected one of said predetermined titles on said display in said selected language according to said corresponding title display data;

displaying, on said display, one of:
the name of said language,
the name of a country using said selected language,
an abbreviation for said selected language, and
an abbreviation for said country using said selected language;

displaying, on said display, a title which is written in a different language from the title which has been displayed on said display but has the same meaning.

10. A camera remote controller for remotely operating a camera which records a title number onto a magnetic record layer on a photographic film, said title number indicating a title, which is selected appropriately according to a subject during photographing; said camera remote controller comprising:

memory storing therein pieces of title information as many as titles which have been prepared beforehand, said title information being composed of a title number indicating a title, which is printed together with a frame image on said photographic film, and title display data for displaying said title on display means in the same mode as a printing mode;

title selecting means for fetching said pieces of title information sequentially from said memory;

display means for displaying said title according to said title display data fetched from said memory in accordance with title selecting operation by said title selecting means;

transmission directing means for directing a transmission of at least said title number; and transmitting means for transmitting a title number indicating a title displayed on said display means upon receiving a transmission direction from said transmission directing means.

11. The camera remote controller as defined in claim 10, wherein said memory stores therein said pieces of title information in the order of their title numbers, and said title selecting means fetches said title information from said memory in alphabetical order of said titles or in the order of the Japanese syllabary of said titles in each operation.

12. The camera remote controller as defined in claim 10, wherein said memory stores therein said pieces of title information in alphabetical order of said titles or in the order of the Japanese syllabary of said titles, and said title selecting means fetches said title information in the order of addresses of said pieces of title information in said memory in each operation.

13. The camera remote controller as defined in claim 10, further comprising display control means for scrolling and displaying, on said display means, a title which is selected by said title selecting means, if the number of characters in said title exceeds the number of characters which can be simultaneously displayed on said display means.

14. The camera remote controller as defined in claim 13, wherein said display control means automatically shifts a title displayed on said display means character by character, and when the last character of said title is displayed, said display control means returns a display state to an initial display state.

15. The camera remote controller as defined in claim 13, wherein said display control means shifts a title displayed on said display means character by character every time character feeding means is operated.

16. The camera remote controller as defined in claim 10, further comprising print number designating means for designating the number of prints and said display means having display means for displaying the number of prints designated by said print number designating means, said transmitting means simultaneously transmitting a title number indicating a title displayed on said display means and the number of prints to said camera.

17. A camera for recording an image on a photographic medium, comprising:

a memory including title numbers, language identifiers, and predetermined titles, each of said predetermined titles corresponding to one of said title numbers, the predetermined titles including different respective meanings, the predetermined titles including sets of language specific titles, there being one of said sets for each of said language identifiers, each of said sets including one of said language specific titles for each of said title numbers;

means for displaying on a display each of said predetermined titles, a presently displayed one of said predetermined titles defining a displayed title;

means for selecting said displayed title to define a selected title;

means for selecting one of said language identifiers to define a selected language; and means for recording on said photographic medium (1) said one of said title numbers to which said selected title corresponds, and (2) a representation of said selected language.

18. The camera as set forth in claim 17, wherein said predetermined titles have a predefined order, and wherein said means for displaying displays said predetermined titles in said predefined order.

19. The camera as set forth in claim 17, further comprising:

said displayed title being initially displayed in an initial display state; and means for controlling said display, defining a display control means, for scrolling said displayed title from said initial display state.

20. The camera as set forth in claim 19, wherein said display control means automatically scrolls said displayed title character by character, and automatically displays said displayed title in said initial display state after displaying a final character of said displayed title.

21. A camera system, comprising:

a camera unit and a remote control unit;

said remote control unit having:

a respective memory including title numbers and predetermined titles, each of said predetermined titles corresponding to one of said title numbers, respective means for displaying on a respective display each of said predetermined titles, a presently displayed one of said predetermined titles defining a remote control unit displayed title, respective means for selecting said remote control unit displayed title to define a remote control selected title, and means for transmitting a remote selection signal representing said remote control selected title;

said camera unit having:

means for recording an image on a photographic medium, means for receiving said remote selection signal; and means for recording on said photographic medium said one of said title numbers to which said remote control selected title corresponds based on said remote selection signal.

22. The camera system as set forth in claim 21, wherein: said camera unit further comprises:

a respective memory containing said title numbers and said predetermined titles as included in said respective memory of said remote control unit, respective means for displaying on a respective display of said camera unit each of said predetermined titles, a presently displayed one of said predetermined titles defining a camera unit displayed title, and respective means for selecting said camera unit displayed title to define a locally selected title; and wherein said means for recording records on said photographic medium said one of said title numbers to which said locally selected title corresponds.

23. The camera system as set forth in claim 22, wherein said predetermined titles have a predefined order, and wherein each of said respective means for displaying included in said camera unit and said respective means for displaying included in said remote control unit displays said predetermined titles in said predefined order.

24. The camera system as set forth in claim 23, wherein each of said remote control unit displayed title and said camera unit displayed title are initially displayed in an initial display state; and each of said remote control unit and said camera unit further comprises respective means for controlling said respective display, defining a respective display control means, for scrolling said respective displayed title from said initial display state.

25. The camera system as set forth in claim 24, wherein each said respective display control means automatically scrolls said respective displayed title character by character, and automatically displays said respective displayed title in said initial display state after displaying a final character of said respective displayed title.

26. The camera system as set forth in claim 21, wherein:

each of said respective memory of said remote control unit and said camera unit includes language identifiers;

said predetermined titles include sets of language specific titles, there being one of said sets for each of said language identifiers, each of said sets including one of said language specific titles for each of said title numbers;

each of said remote control unit and said camera unit further comprises respective means for selecting one of said language identifiers to define a selected language; and said means for recording records on said photographic medium also a representation of said selected language.

27. A camera system, comprising:

a camera unit, a remote control unit, and a printing unit;

said remote control unit having a respective memory including title numbers and predetermined titles, each of said predetermined titles corresponding to one of said title numbers, respective means for displaying on a respective display each of said predetermined titles, a presently displayed one of said predetermined titles defining a remote control unit displayed title, respective means for selecting said remote control unit displayed title to define a remote control selected title, and means for transmitting a remote selection signal representing said remote control selected title;

said camera unit having means for recording an image on a photographic medium, means for receiving said remote selection signal, means for recording on said photographic medium said one of said title numbers to which said remote control selected title corresponds based on said remote selection signal, a respective memory containing said title numbers and said predetermined titles as included in said respective memory of said remote control unit, respective means for displaying on a respective display of said camera unit each of said predetermined titles, a presently displayed one of said predetermined titles defining a camera unit displayed title, and respective means for selecting said camera unit displayed title to define a locally selected title, wherein said means for recording records on said photographic medium said one of said title numbers to which said locally selected title corresponds; and said printing unit having a respective memory containing said title numbers and said predetermined titles as included in said respective memory of said camera unit, and means for providing on a print an image corresponding to said image recorded on said photographic medium and including said one of said predetermined titles corresponding to said title number recorded on said photographic medium by said camera unit.

28. The camera system as set forth in claim 27, wherein said predetermined titles have a predefined order, and wherein each of said respective means for displaying included in said camera unit and said respective means for displaying included in said remote control unit displays said predetermined titles in said predefined order.

29. The camera system as set forth in claim 28, wherein each of said remote control unit displayed title and said camera unit displayed title are initially displayed in an initial display state; and each of said remote control unit and said camera unit further comprises respective means for controlling said respective display, defining a respective display control means, for scrolling said respective displayed title from said initial display state.

30. The camera system as set forth in claim 29, wherein each said respective display control means automatically scrolls said respective displayed title character by character, and automatically displays said respective displayed title in said initial display state after displaying a final character of said respective displayed title.

31. The camera system as set forth in claim 27, wherein:

each of said respective memory of said remote control unit, said camera unit, and said printer unit includes language identifiers;

said predetermined titles include sets of language specific titles, there being one of said sets for each of said language identifiers, each of said sets including one of said language specific titles for each of said title numbers;

each of said remote control unit and said camera unit further comprises respective means for selecting one of said language identifiers to define a selected language;

said means for recording records on said photographic medium also a representation of said selected language; and said one of said predetermined titles included on said print is determined based on said title number and also on said selected language.

* * * * *